(12) United States Patent
Jeong et al.

(10) Patent No.: US 7,891,720 B2
(45) Date of Patent: Feb. 22, 2011

(54) DOUBLE FOLDING SEAT FOR VEHICLE

(75) Inventors: Chan Ho Jeong, Seoul (KR); Young Dong Kim, Seongnam-si (KR); Sung Hak Hong, Suwon-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 0 days.

(21) Appl. No.: 12/548,190

(22) Filed: Aug. 26, 2009

(65) Prior Publication Data

US 2010/0127545 A1  May 27, 2010

(30) Foreign Application Priority Data

Nov. 27, 2008 (KR) .................. 10-2008-0119164

(51) Int. Cl.
*B60N 2/12* (2006.01)
(52) U.S. Cl. ............... 296/65.09; 296/65.13; 297/319; 297/326; 297/336; 248/503.1
(58) Field of Classification Search ............. 296/65.05, 296/65.09, 65.13, 65.14; 297/319, 326, 336; 248/503.1
See application file for complete search history.

(56) References Cited

U.S. PATENT DOCUMENTS

| 4,143,911 | A * | 3/1979 | Sakakibara et al. | 297/341 |
| 7,452,033 | B2 * | 11/2008 | Ma et al. | 297/336 |
| 2009/0152889 | A1 * | 6/2009 | Jeong | 296/65.09 |

* cited by examiner

*Primary Examiner*—Dennis H Pedder
(74) *Attorney, Agent, or Firm*—Morgan, Lewis & Bockius LLP

(57) ABSTRACT

A double folding seat for a vehicle may include a stationary bracket, coupled to the seatback frame and to the cushion frame, wherein the recliner bracket is coupled to the one end of the stationary bracket, a link unit elastically installed on the stationary bracket and configured to be selectively coupled to the recliner bracket and transmit a rotating force of the recliner bracket to a latch cam installed to the cushion frame, a stopper fixedly installed on the leg assembly which is connected to a vehicle body, a hinge member rotatably mounted on the cushion frame and rotated by the stopper, and an actuating wire connecting the hinge member and the link unit and displacing the link unit by a rotation force of the hinge member to a position where the link unit cooperates with the recliner bracket when the cushion frame moves backwards to the final position thereof.

8 Claims, 16 Drawing Sheets

DOUBLE FOLDING SEAT FOR VEHICLE

CROSS-REFERENCE TO RELATED APPLICATIONS

The present application claims priority to Korean Patent Application Number 10-2008-0119164 filed Nov. 27, 2008, the entire contents of which application is incorporated herein for all purpose by this reference.

BACKGROUND OF THE INVENTION

1. Field of the Invention

The present invention relates, in general, to a double folding seat for a vehicle, in which a seatback frame is folded on a cushion frame by rotation of a recliner bracket, and the cushion frame pivots against a leg assembly by unlocking a latch cam from a lock plate.

2. Description of the Related Art

In both recreational vehicles and high-occupancy vehicles, a double folding seat is installed in the second row for the convenience of third-row occupants.

This double folding seat is folded in a forward direction by folding a seatback in the forward direction and then folding the seat cushion in the forward direction.

However, in the case in which a cushion frame is folded by being slid on a leg assembly, when an occupant getting on or off of the vehicle places or presses his/her hand on the seat which has been thus unstably folded twice, there is a problem in that the hand or leg of the occupant is injured by an exposed slide or vertical motion of the seat.

For example, as illustrated in FIGS. 10A through 11B, when a seatback frame 10 is folded on a cushion frame 20, a rotating bracket 13 connected to a latch wire 12 is simultaneously rotated by rotation of a recliner bracket 11.

When the seatback frame 10 is additionally folded on the cushion frame 20, the latch wire 12 is pulled by the recliner bracket 11, and simultaneously the latch cam of the cushion frame 20 rotates. The latch cam rotates a lock plate, thereby unlocking the lock plate from a leg assembly 30.

As illustrated in FIG. 12A or 12B, when the lock plate is unlocked from the leg assembly 30, the cushion frame 20 can be folded on the leg assembly. In this folding process, the seat does not get correctly folded due to interference of a leading end thereof with a floor. At the same time, although the seat is folded, the folded seat has a problem in that the hand or leg of the occupant may be injured by an exposed slide or vertical motion of the seat.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a double folding seat for a vehicle, which can prevent an occupant from being injured by a seat cushion being folded before the seat has moved back to its final position.

In an aspect of the present invention, the double folding seat for a vehicle, in which a seatback frame is configured to be folded on a cushion frame by rotation of a recliner bracket, and the cushion frame is configured to pivot against a leg assembly by unlocking the cushion frame from the leg assembly slidably supporting the cushion frame, may include a stationary bracket, one end of which is pivotally coupled to the seatback frame and the other end of which is fixed to the cushion frame, wherein the recliner bracket is coupled to the one end of the stationary bracket, a link unit elastically installed on the stationary bracket and configured to be selectively coupled to the recliner bracket and transmit a rotating force of the recliner bracket to a latch cam installed to the cushion frame, a stopper fixedly installed on the leg assembly which is connected to a vehicle body, a hinge member rotatably mounted on the cushion frame and rotated by the stopper when the cushion frame moves backwards to a final position thereof, and an actuating wire connecting the hinge member and the link unit and displacing the link unit by a rotation force of the hinge member to a position where the link unit cooperates with the recliner bracket when the cushion frame moves backwards to the final position thereof.

In another aspect of the present invention, the link unit may include a retainer which is fixedly coupled to the stationary bracket and a sliding member which is slidably coupled to the retainer, one end portion of the sliding member is connected to the latch cam by a latch wire so as to transmit the rotational force of the recliner bracket to the latch cam and a rotational center of the sliding member is connected to the actuating wire so as to control selective engagement of the sliding member with the recliner bracket, wherein the sliding member includes a protruding catch stub configured to be located on a rotational trajectory of the recliner bracket when the hinge member is rotated, wherein the latch cam is rotatably installed on the cushion frame so as to be connected with the sliding member via the latch wire and rotate to unlock a lock plate by pulling of the latch wire, wherein the lock plate is rotatably installed on the cushion frame, and is rotated to unlock the cushion frame from the leg assembly by rotation of the latch cam, and wherein the stationary bracket includes an insertion slot into which the latch wire is fitted.

In further another aspect of the present invention, the sliding member may be elastically supported by an elastic member in a rotational direction thereof so as to return the sliding member to an original position when the sliding member is disengaged with the recliner bracket.

The hinge member may be bent-shaped so as to be in contact with the stopper when the cushion frame moves back to the final position.

According to various aspects of the present invention, the double folding seat is configured so that a seat cushion can be folded twice only when moving back to the final position. Thus, the double folding seat can previously prevent an occupant from being injured by the seat cushion being folded prior to moving back to the final position.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A double folding seat for a vehicle according to various embodiments of the present invention has a notable feature of a seat of the vehicle being able to be folded twice only when having been moved completely back.

Figure 1:
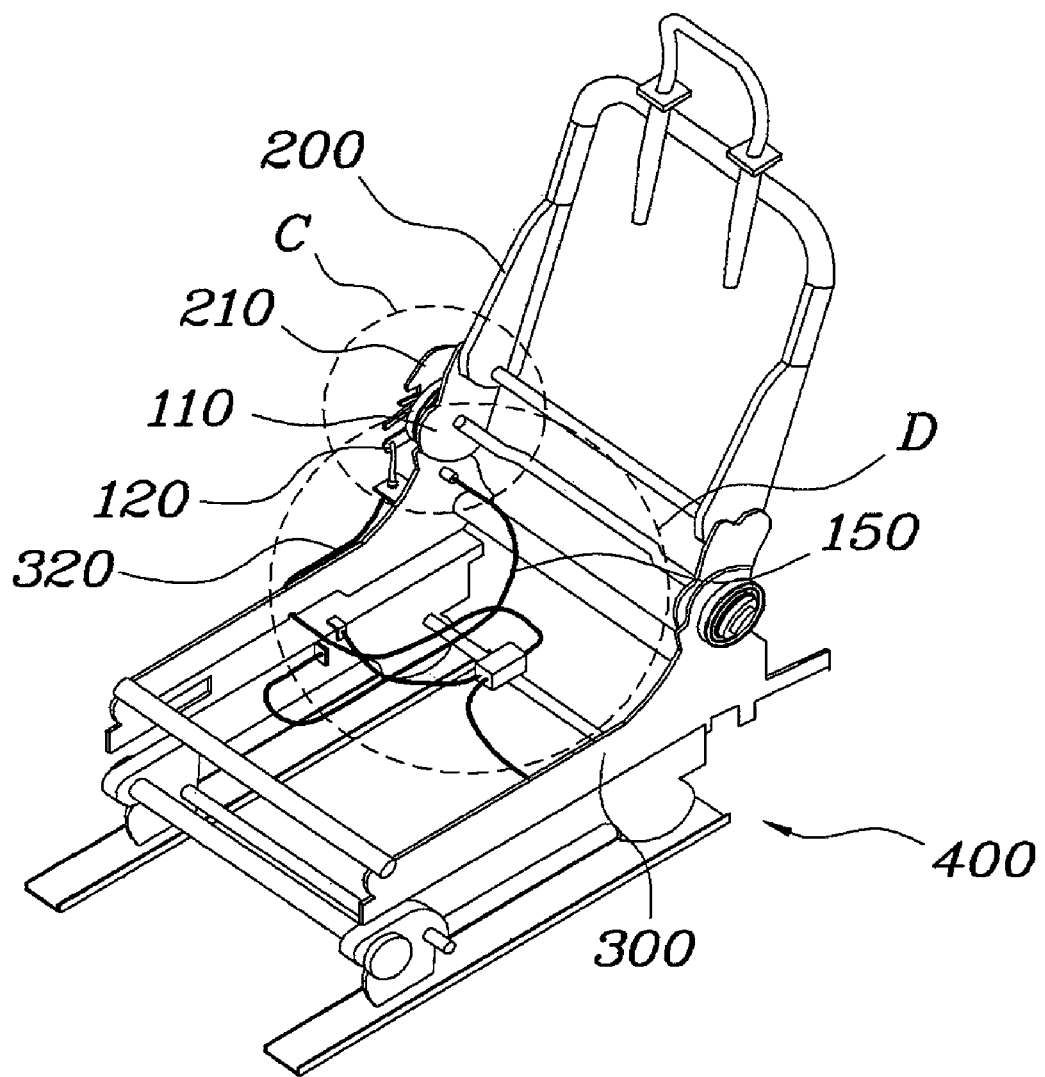
FIG. 1 is a perspective view illustrating the configuration of an exemplary double folding seat according to the present invention.
Figure 2:
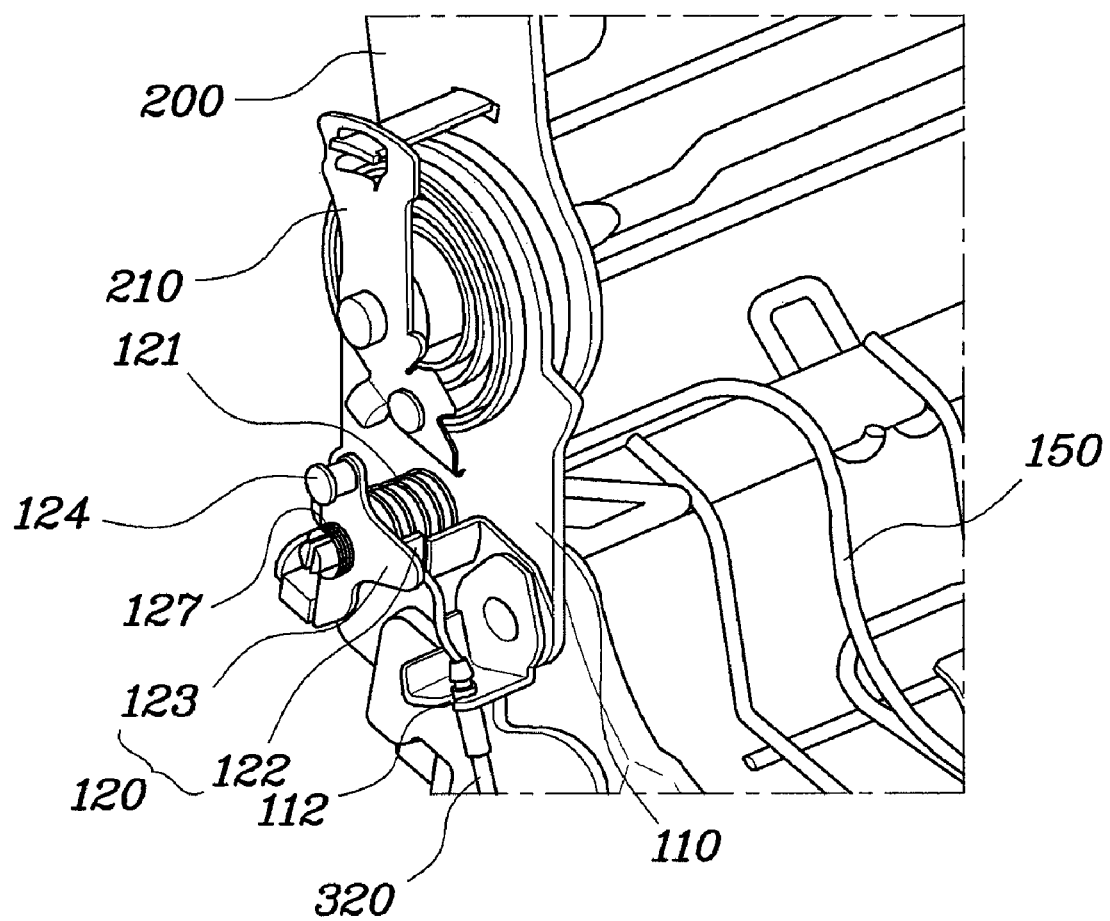
FIG. 2 is an enlarged view of part "C" of FIG. 1 when viewed from a different angle.
Figure 3:
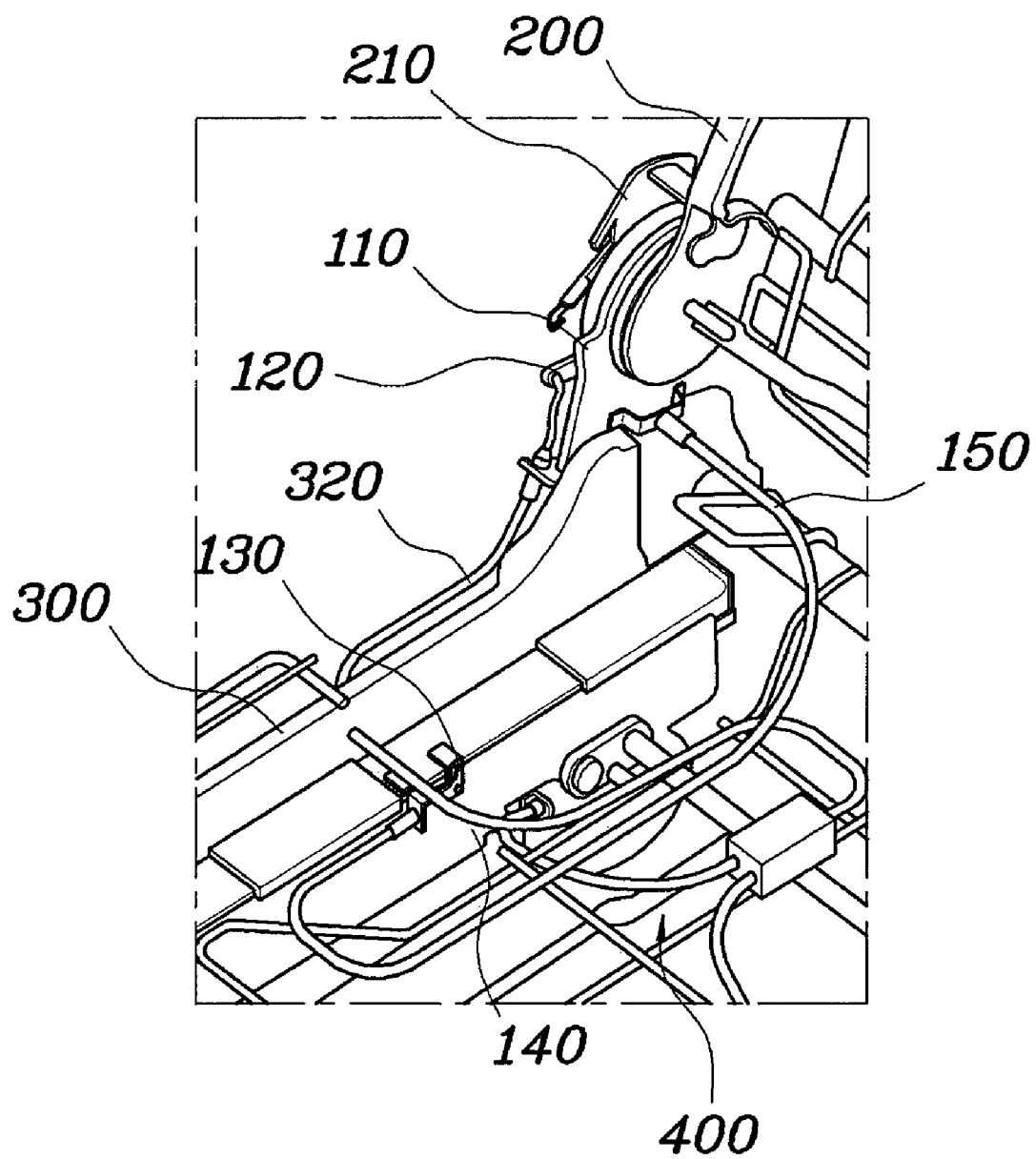
FIG. 3 is an enlarged view of part "D" of FIG. 1.

As illustrated in FIGS. 1 through 3, the double folding seat for a vehicle includes a link unit 120 selectively transmitting the rotating force of a recliner bracket 210 to a latch cam 410, a binge member 130 rotated against a cushion frame 300 when a seat of the vehicle moves back to its final position, and an actuating wire 150 pulled by the rotation of the hinge member 130 and thus displacing the link unit 120 to a position where the link unit 120 cooperates with the recliner bracket 210.

In detail, a seatback frame 200 is installed on a leg assembly 400 so as to be able to slide back and forth. The recliner bracket 210 is connected to a hinge shaft of the seatback frame 200 so as to move together. The recliner bracket 210 rotates when the seatback frame 200 pivots, thereby rotating the link unit 120 located on a rotational trajectory thereof.

The cushion frame 300 is also installed on a leg assembly 400 so as to be able to slide back and forth. Also, the cushion frame 300 is equipped with the latch cam 410 connected with the link unit 120 via a latch wire 320, and a lock plate 420 locked to or unlocked from the latch cam 410.

More specifically, when the latch cam 410 and the lock plate 420 rotate because of the link unit 120 rotating, the rotated lock plate 420 unlocks a striker of the leg assembly 400. Thereby, the lock plate 420 of the cushion frame 300 can be separated from the striker of the leg assembly 400. In this state, the cushion frame 300 can be folded twice when pivoting.

The link unit 120 selectively transmits the rotating force of the recliner bracket 210 to the latch cam 410 between the recliner bracket 210 and the latch cam 410.

Figure 4:
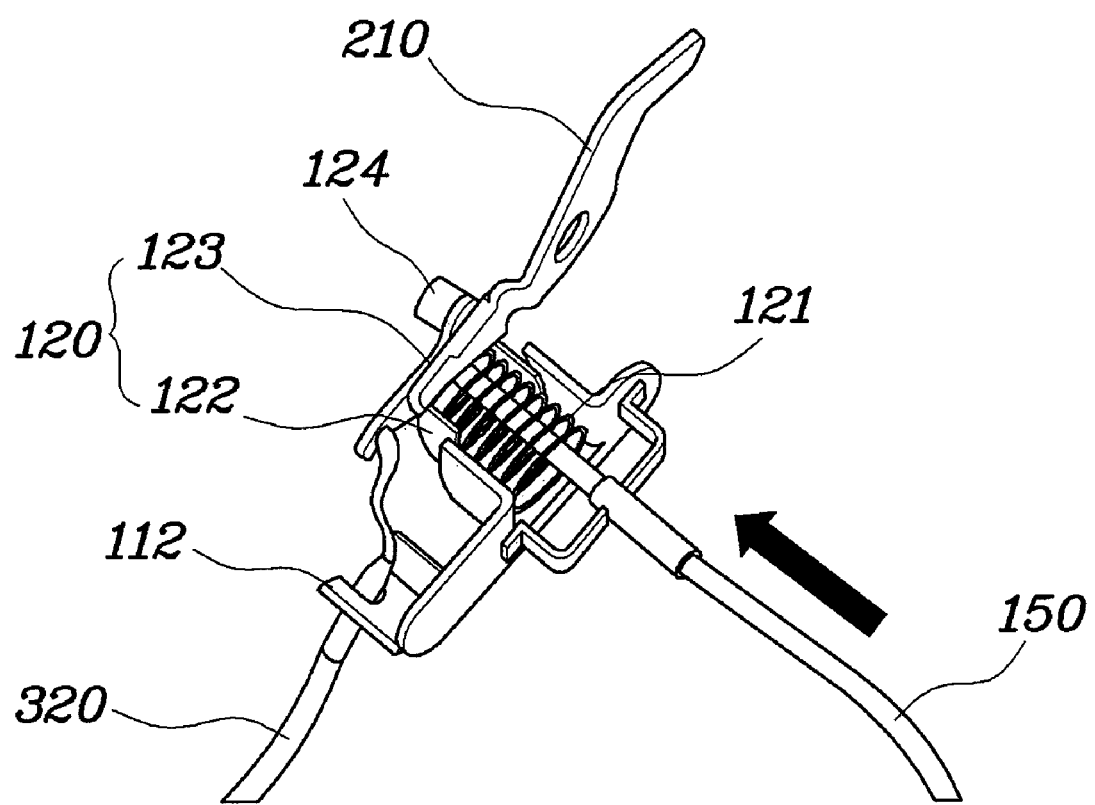
FIG. 4 is a perspective view illustrating the configuration of a double folding seat in the state in which a seatback slides.
Figure 5:
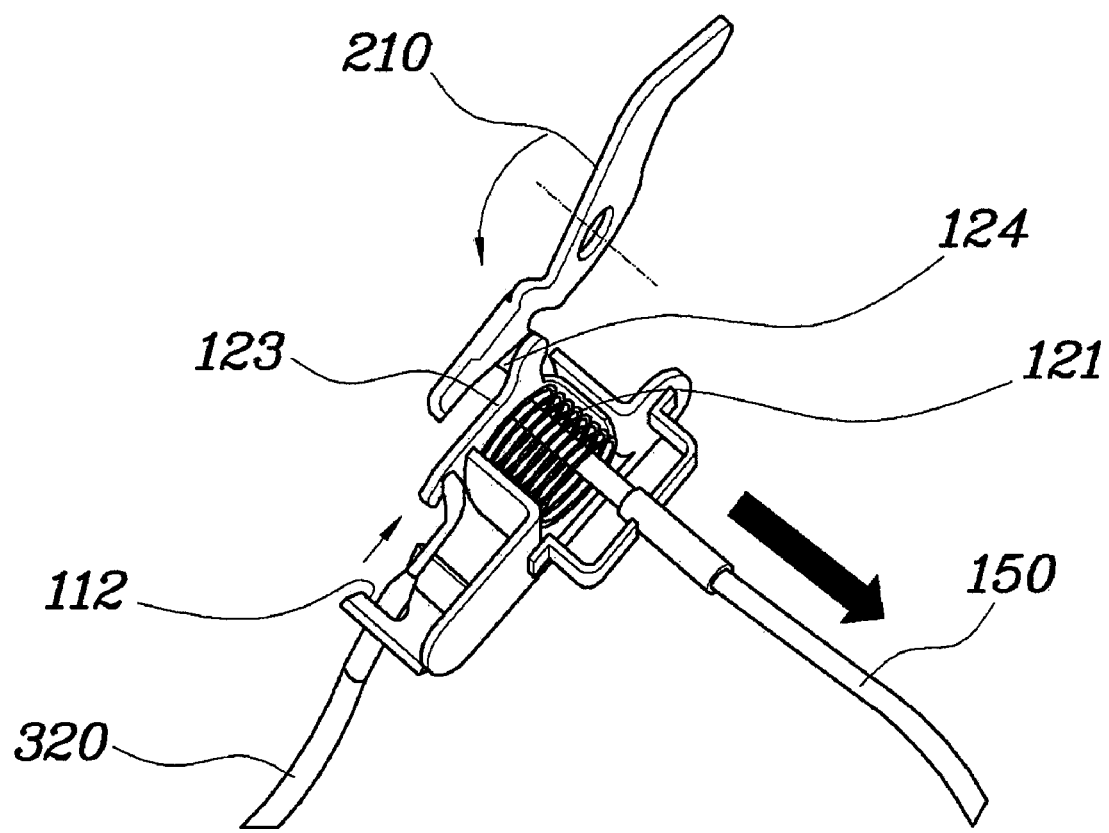
FIG. 5 is a perspective view illustrating the configuration of a double folding seat in the state in which a seatback moves back to the final position.

In detail, as illustrated in FIG. 4, while the cushion frame 300 is sliding on the leg assembly 400, the link unit 120 deviates from the rotational trajectory of the recliner bracket 210. As a result, the rotating force of the recliner bracket 210 is not transmitted to the latch cam 410. In contrast, as illustrated in FIG. 5, when the cushion frame 300 is located at the closest point near the rear of the leg assembly 400, the link unit 120 is located on the rotational trajectory of the recliner bracket 210. As a result, the rotating force of the recliner bracket 210 can be transmitted to the latch cam 410.

To this end, the link unit 120 is installed on a stationary bracket 110 of the seatback frame 200. The stationary bracket 110 is fixedly installed on the side of the seatback frame 200 so as to support the link unit 120. This stationary bracket 110 elastically supports the link unit 120 through an elastic spring 121, and allows a latch wire 320 of the link unit 120 to be mounted through an insertion slot 112 thereof.

The link unit 120 includes a retainer 122 which is slidably coupled to the stationary bracket 110 and is connected with the actuating wire 150, and a sliding member 123 which is coupled to the retainer 122 and is connected with the latch cam 410 via a latch wire 320.

This link unit 120 elastically supports the elastic spring 121 of the stationary bracket 110. Thus, when the link unit 120 is pulled by the actuating wire 150, the elastic spring 121 is compressed, and thus a catch stub 124 of the link unit 120 moves toward the rotational trajectory of the recliner bracket 210. Here, when located on the rotational trajectory of the recliner bracket 210, the catch stub 124 is rotated by rotation of the recliner bracket 210. The rotated catch stub 124 transmits the rotating force of the recliner bracket 210 to the latch wire 320 such that the latch cam 410 is rotated.

Figure 6A:
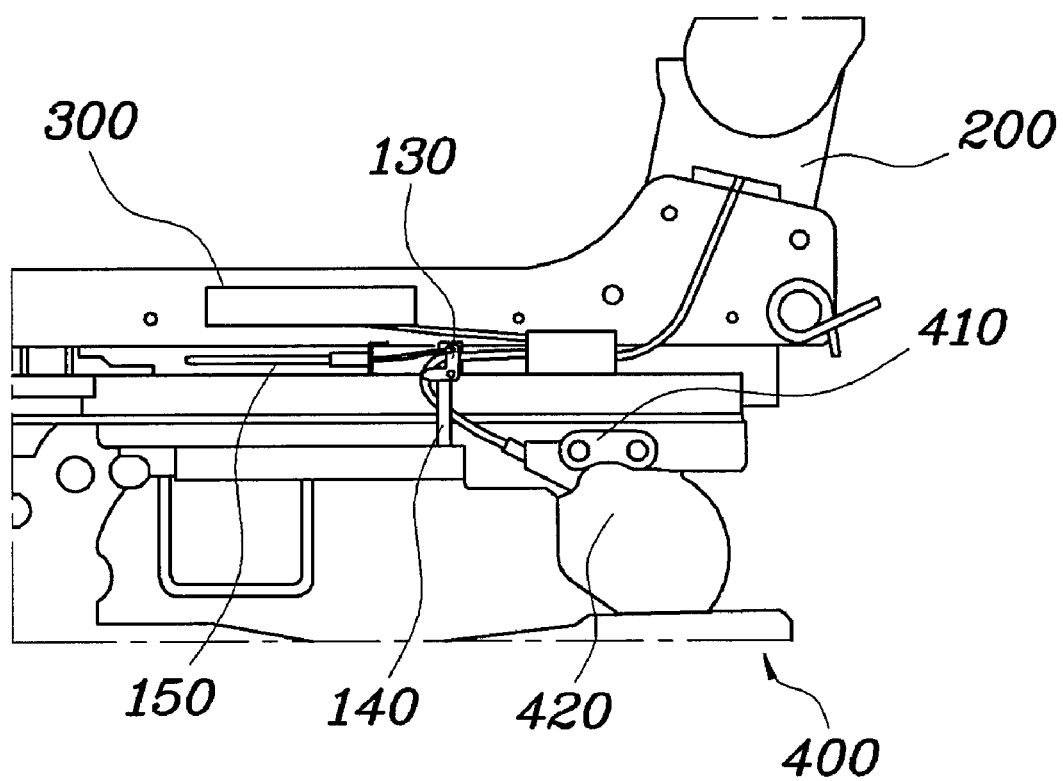
FIG. 6A is a side view illustrating a hinge member of a double folding seat in the state in which a seatback slides.
Figure 6B:
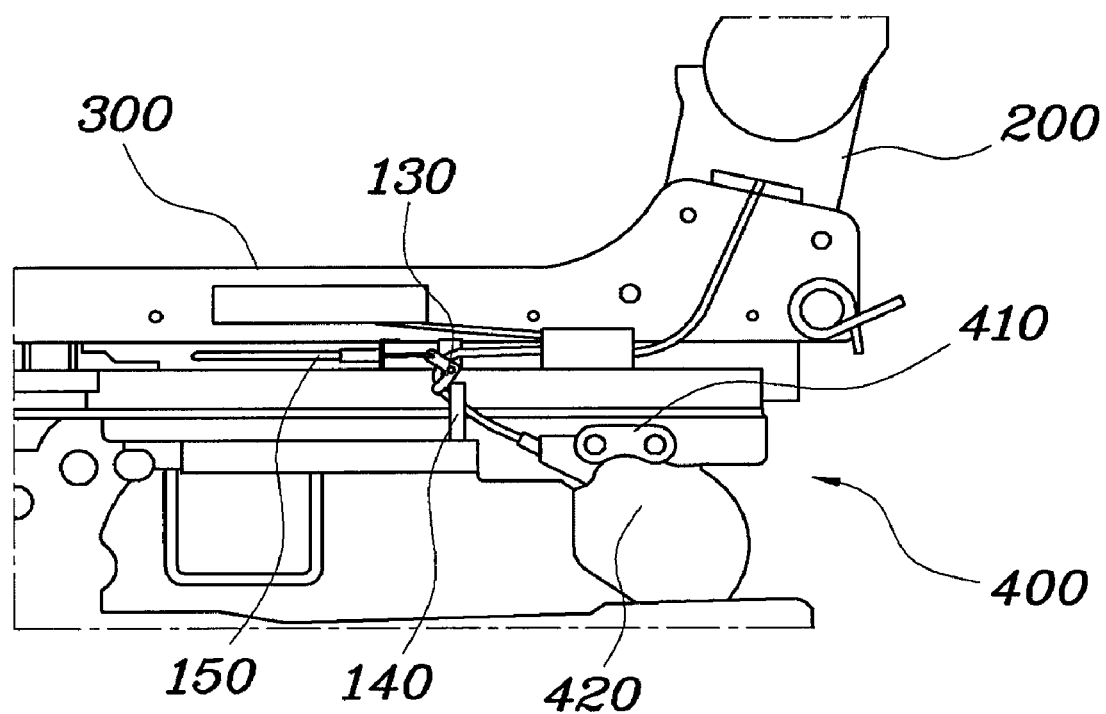
FIG. 6B is a side view illustrating a hinge member of a double folding seat in the state in which a seatback moves back to the final position.

As illustrated in FIGS. 6A and 6B, the actuating wire 150 connects the hinge member 130 and the link unit 120, and thus is pulled by rotation of the hinge member 130 when the cushion frame 300 moves back to the final position. Thus, when the actuating wire 150 is pulled by the rotation of the hinge member 130, the link unit 120 can move toward the rotational trajectory of the recliner bracket 210.

The hinge member 130 is rotatably mounted on the cushion frame 300, and can be rotated by a stopper 140 installed on the leg assembly. To this end, the hinge member 130 and the stopper 140 are installed so as to correspond to the cushion frame 300 and the leg assembly 400 respectively at the final position to which the cushion frame 300 moves back so as to be able to make contact with each other.

At this time, the hinge member 130 is preferably bent so as to be in contact with the stopper 140 when the cushion frame 300 moves back to the final position. Thus, when the cushion frame 300 moves back to the final position, the hinge member 130 can pull the actuating wire 150 while being smoothly rotated by the stopper 140.

The sliding member 123 may be elastically supported by an elastic member 127 in a rotational direction thereof so as to return the sliding member 123 to the original position when the sliding member 123 is disengaged with the recliner bracket 210.

The operation of the double folding seat having this configuration will be described below.

Figure 7A:
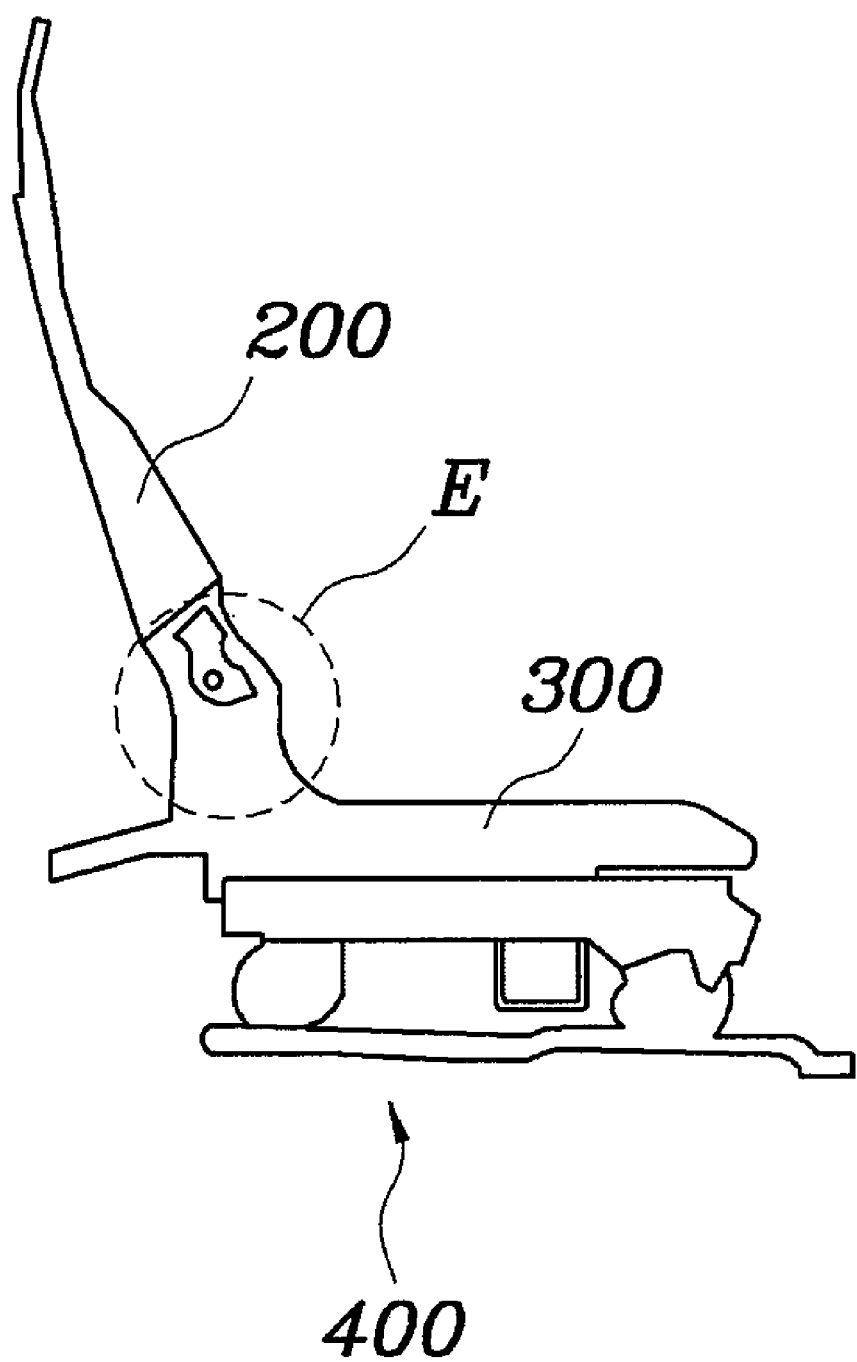
FIG. 7A is a side view illustrating a double folding seat before a seatback is folded.
Figure 7B:
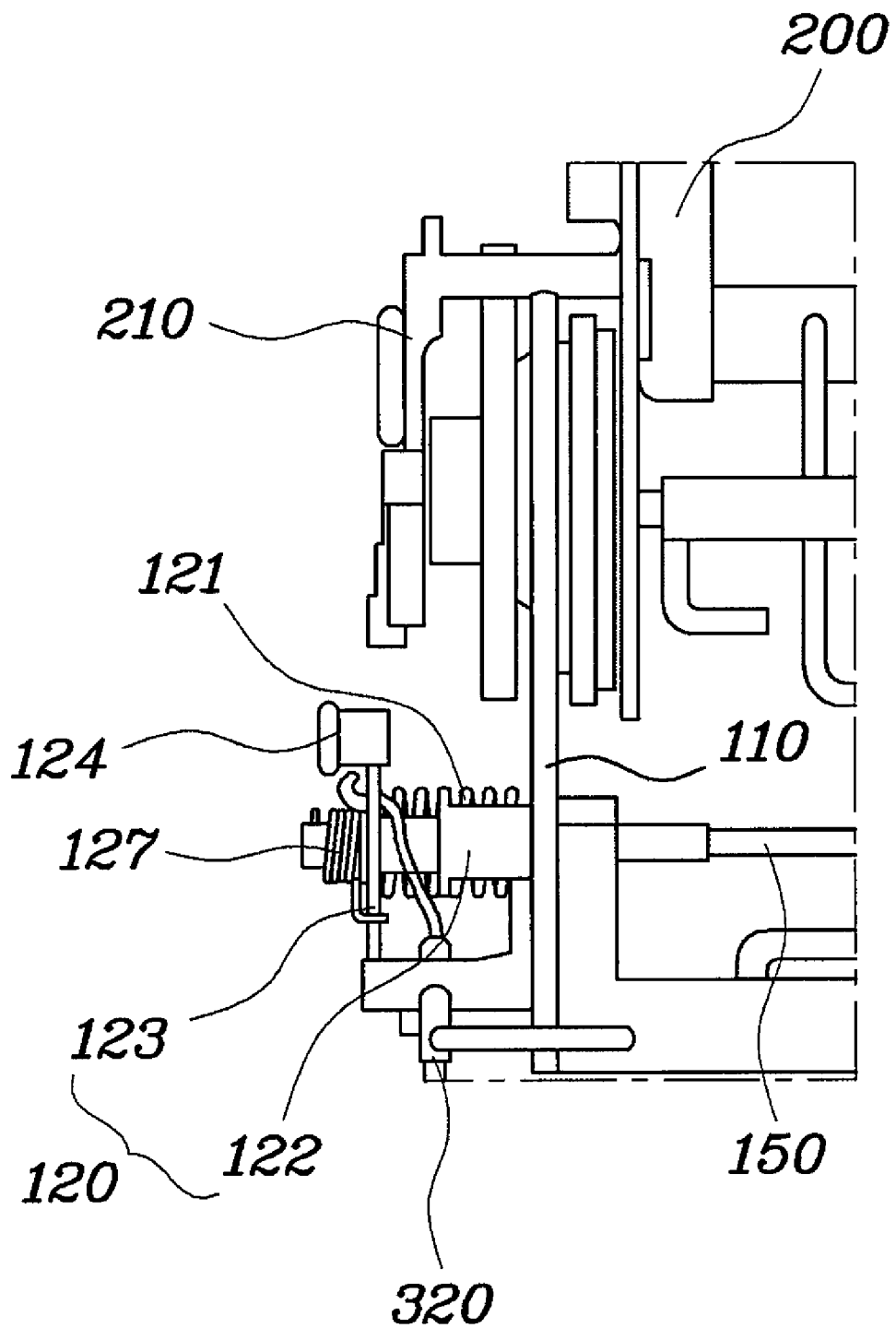
FIG. 7B is an enlarged view of part "E" of FIG. 7A.

As illustrated in FIGS. 7A and 7B, while the cushion frame 300 is sliding on the leg assembly 400, the link unit 120 deviates from the rotational trajectory of the recliner bracket 210.

Figure 8A:
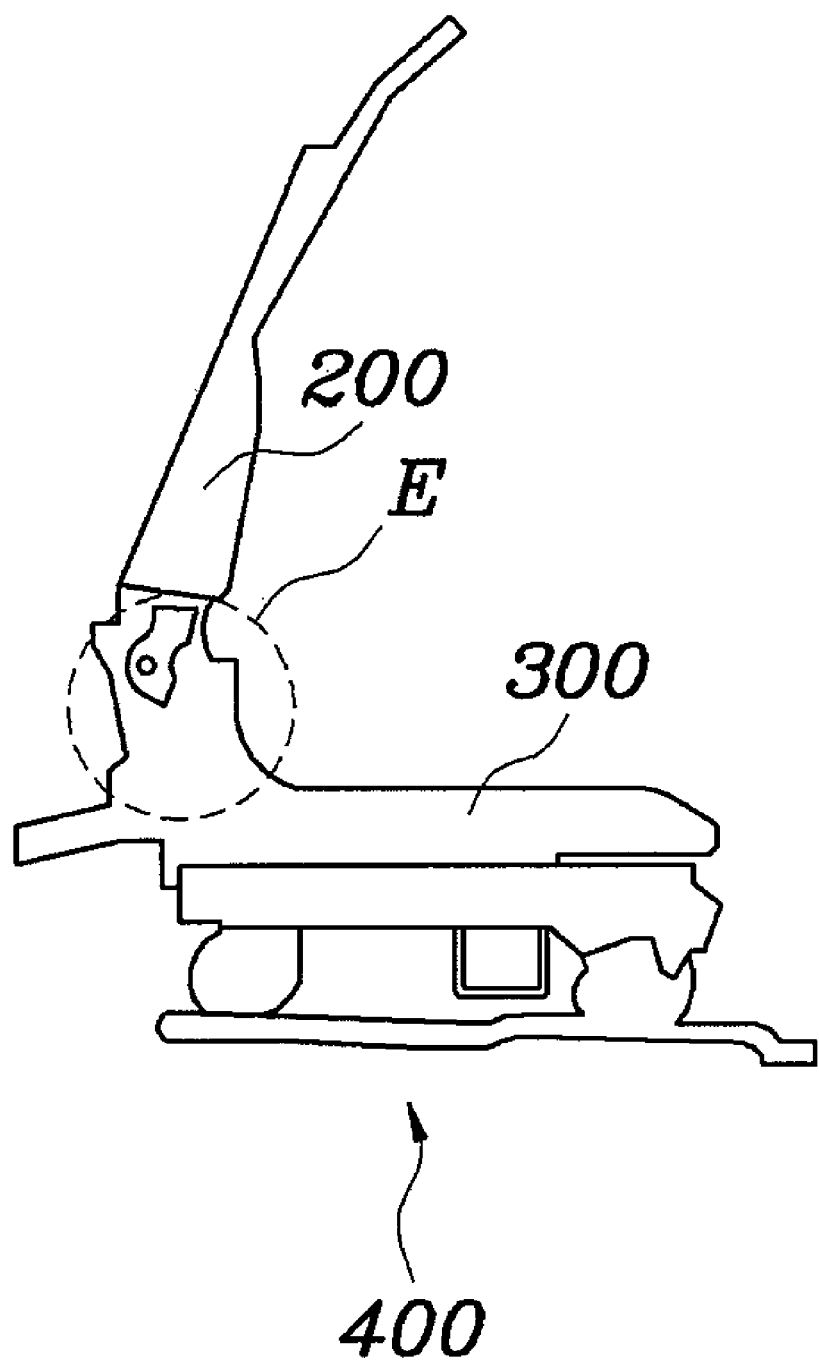
FIG. 8A is a side view illustrating a double folding seat in the state in which a seatback is sliding.
Figure 8B:
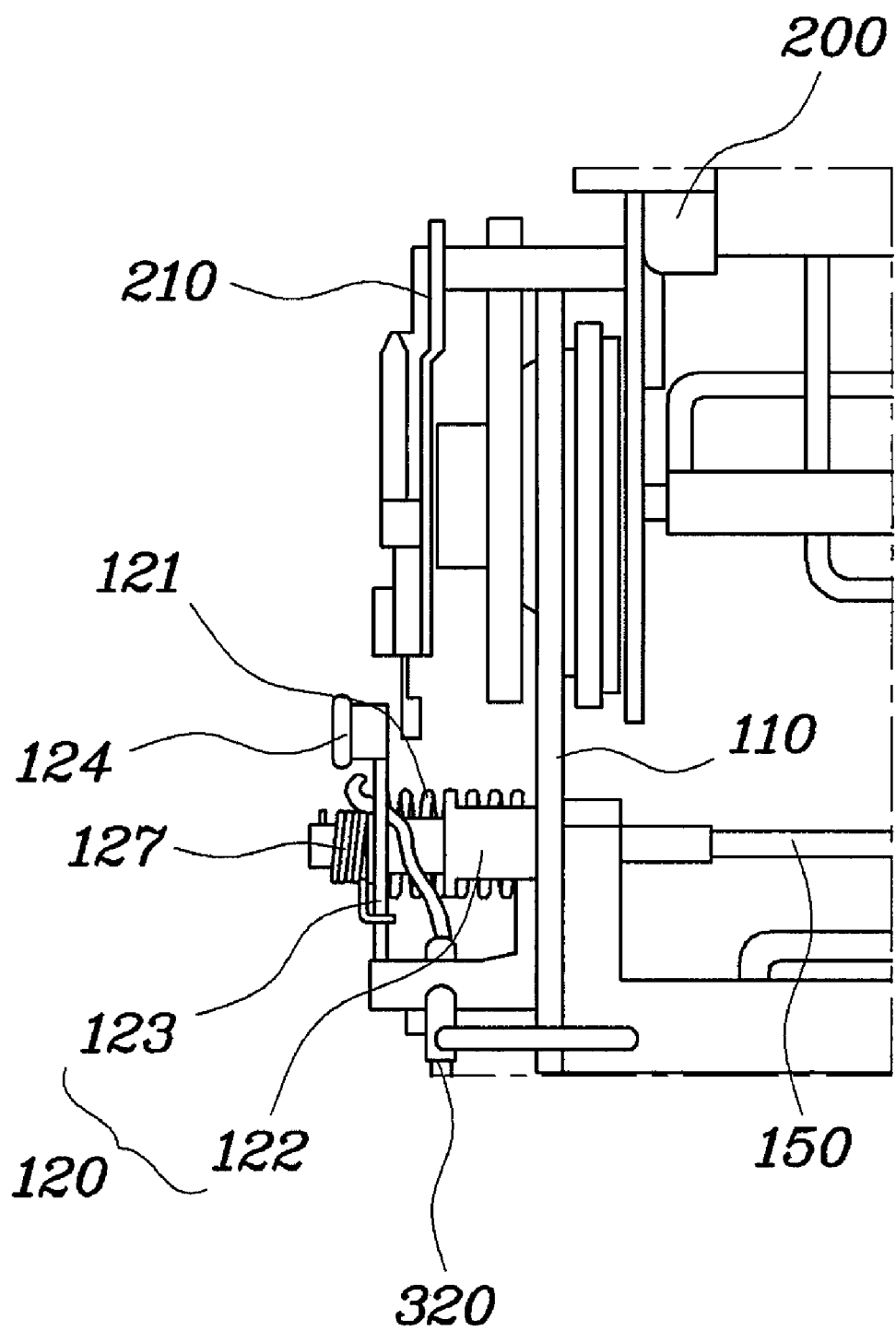
FIG. 8B is an enlarged view of part "E" of FIG. 8A.

As illustrated in FIGS. 8A and 8B, when the seatback frame 200 is folded while the cushion frame 300 is sliding on the leg assembly 400, the recliner bracket 210 rotates. At this time, the link unit 120 is not located on the rotational trajectory of the recliner bracket 210. Thus, although the recliner bracket 210 rotates, the link unit 120 does not rotate. As a result, the cushion frame 300 does not fold.

Figure 9A:
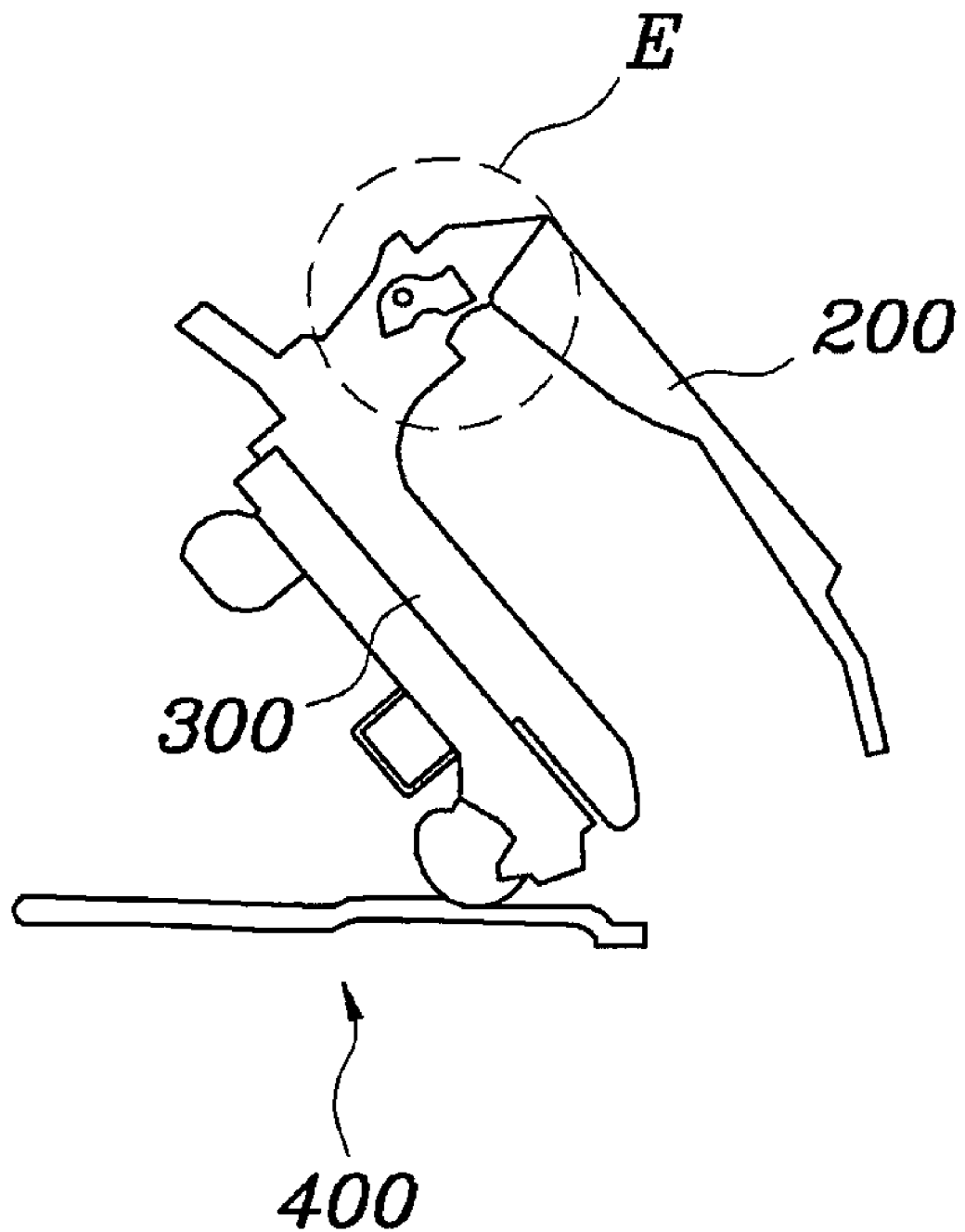
FIG. 9A is a side view illustrating a double folding seat in the state in which a seatback moves back to the final position.
Figure 9B:
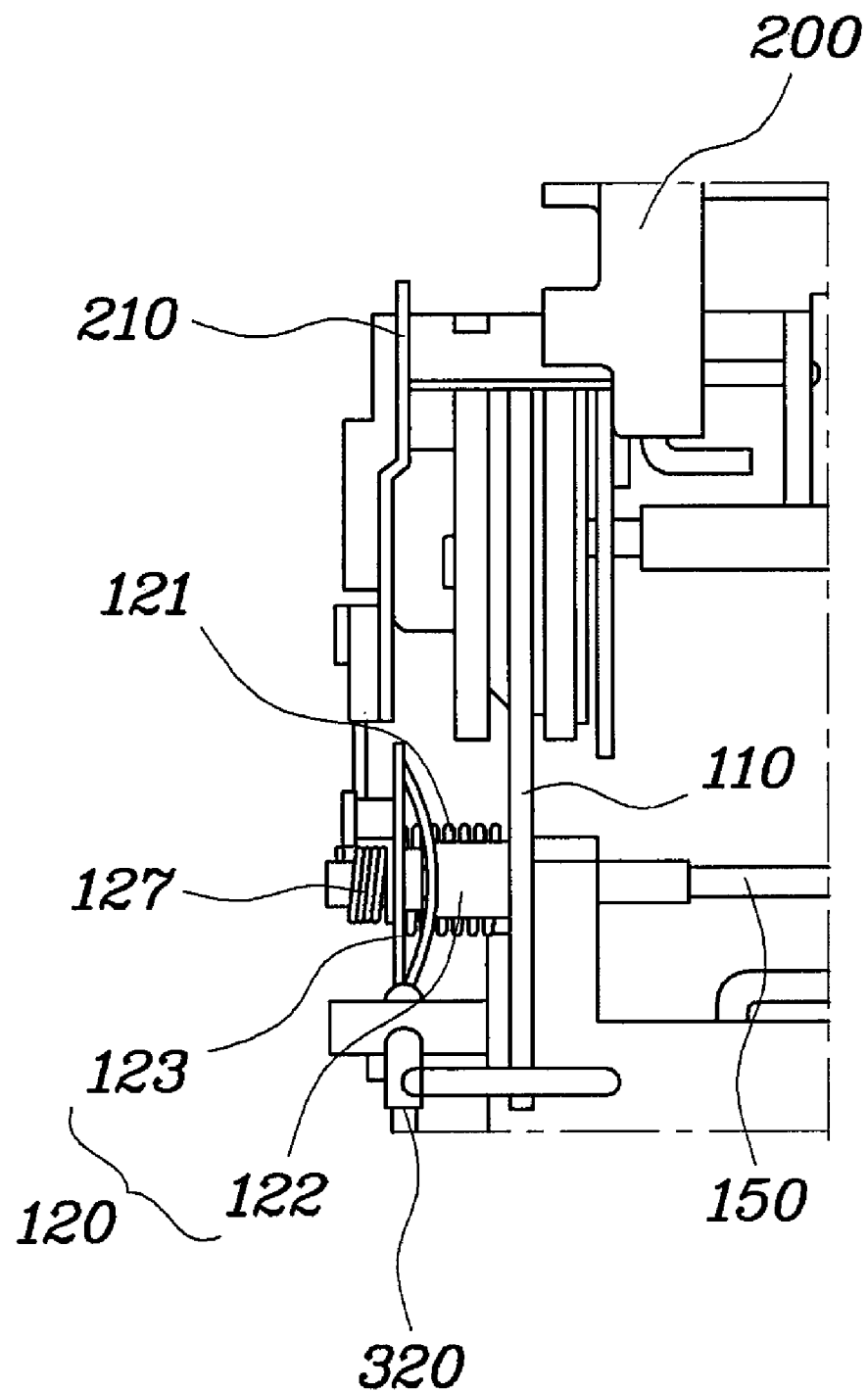
FIG. 9B is an enlarged view of part "F" of FIG. 9A.
Figure 10A:
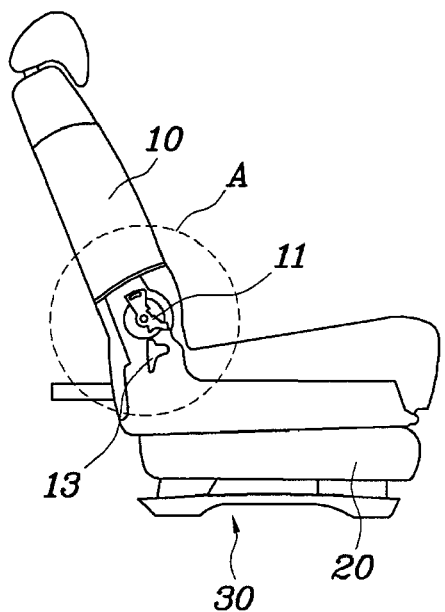
FIG. 10A is a side view illustrating a conventional double folding seat for a vehicle in the state in which a recliner bracket is rotating.
Figure 10B:
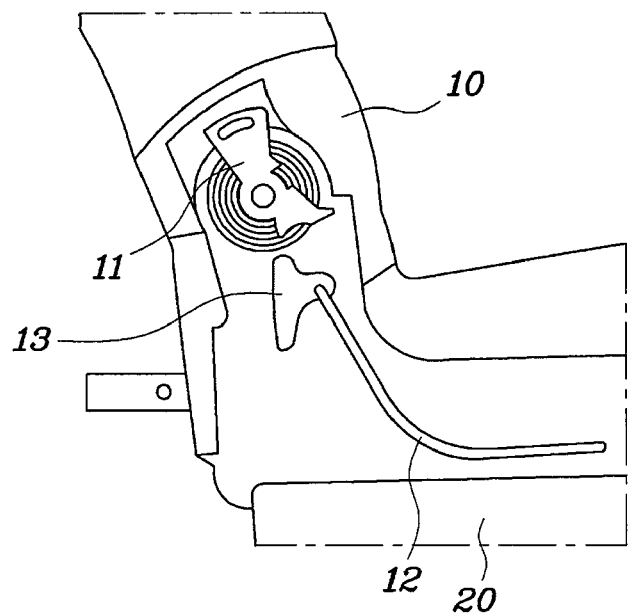
FIG. 10B is an enlarged view of part "A" of FIG. 10A.
Figure 11A:
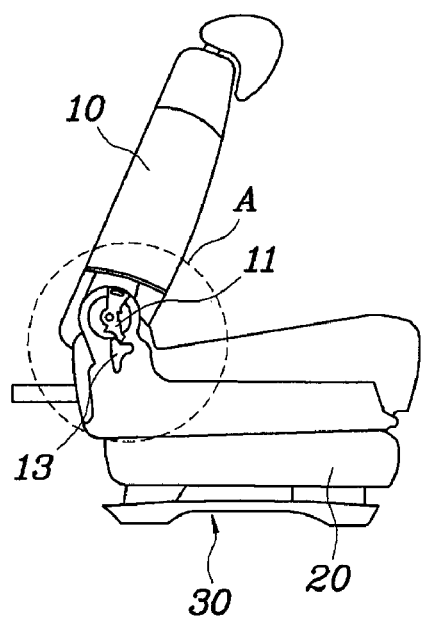
FIG. 11A is a side view illustrating the state in which a recliner bracket and a latch cam are simultaneously rotating while a seatback is additionally being folded from the position of FIG. 10A.
Figure 11B:
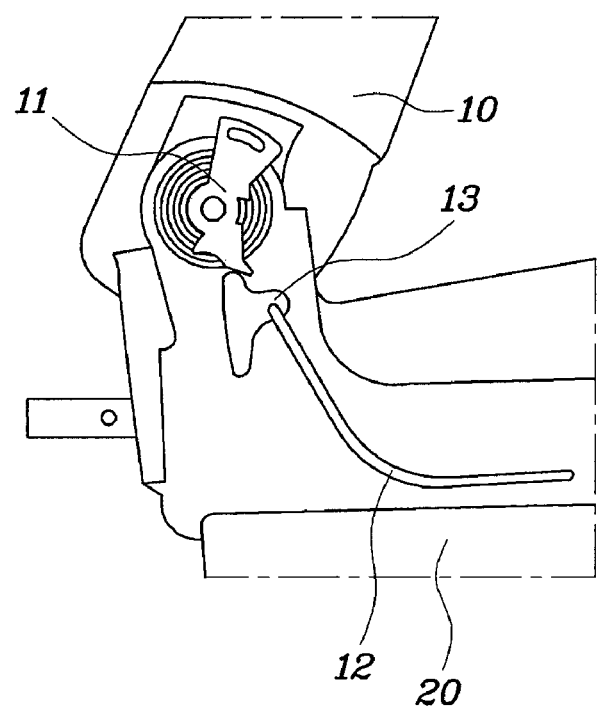
FIG. 11B is an enlarged view of part "A" of FIG. 11A.
Figure 12A:
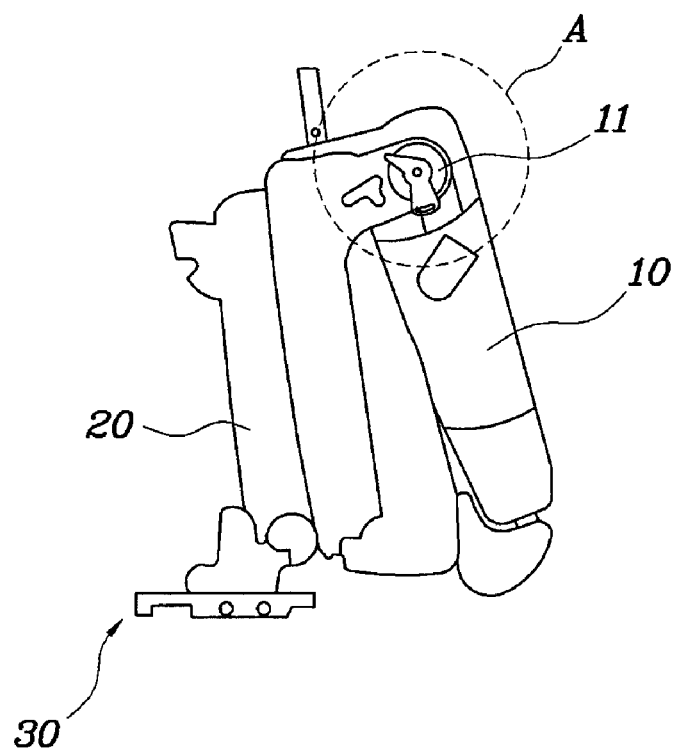
FIG. 12A is a side view illustrating the state in which a seatback has been completely folded from the position of FIG. 11A.
Figure 12B:
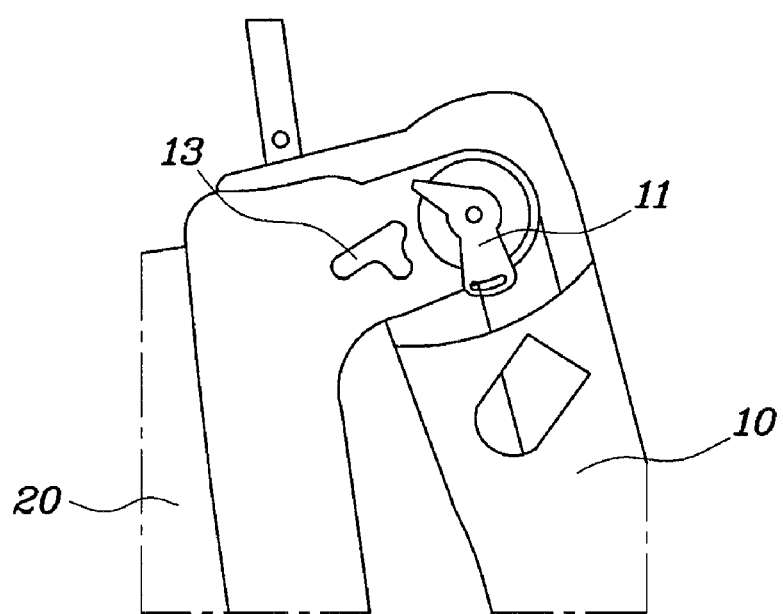
FIG. 12B is an enlarged view of part "A" of FIG. 12A.

As illustrated in FIGS. 6B, 9A, and 9B, when the cushion frame 300 is located closest to the rear of the leg assembly 400, the hinge member 130 is rotated by the stopper 140 of the leg assembly 400. When the hinge member 130 is rotated, the actuating wire 150 is pulled, and thus the link unit 120 moves toward the rotational trajectory of the recliner bracket 210. At this time, when moving toward the rotational trajectory of the recliner bracket 210, the link unit 120 is rotated by the rotation of the recliner bracket 210, and thus transits the rotating force from the recliner bracket 210 to the latch wire 320. As a result, the latch cam 410 is rotated by the latch wire 320. This rotation of the latch cam 410 causes the lock plate 420 to rotate. As the lock plate 420 rotates, the striker of the leg assembly 400 unlocks.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A double folding seat for a vehicle, in which a seatback frame is configured to be folded on a cushion frame by rotation of a recliner bracket, and the cushion frame is configured to pivot against a leg assembly by unlocking the cushion frame from the leg assembly slidably supporting the cushion frame, the double folding seat comprising:

a stationary bracket one end of which is pivotally coupled to the seatback frame and the other end of which is fixed to the cushion frame, wherein the recliner bracket is coupled to the one end of the stationary bracket;

a link unit elastically installed on the stationary bracket and configured to be selectively coupled to the recliner bracket and transmit a rotating force of the recliner bracket to a latch cam installed to the cushion frame;

a stopper fixedly installed on the leg assembly which is connected to a vehicle body;

a hinge member rotatably mounted on the cushion frame and rotated by the stopper when the cushion frame moves backwards to a final position thereof; and an actuating wire connecting the hinge member and the link unit and displacing the link unit by a rotation force of the hinge member to a position where the link unit cooperates with the recliner bracket when the cushion frame moves backwards to the final position thereof.

2. The double folding seat as set forth in claim 1, wherein the link unit includes a retainer which is fixedly coupled to the stationary bracket and a sliding member which is slidably coupled to the retainer, one end portion of the sliding member is connected to the latch cam by a latch wire so as to transmit the rotational force of the recliner bracket to the latch cam and a rotational center of the sliding member is connected to the actuating wire so as to control selective engagement of the sliding member with the recliner bracket.

3. The double folding seat as set forth in claim 2, wherein the sliding member includes a protruding catch stub configured to be located on a rotational trajectory of the recliner bracket when the hinge member is rotated.

4. The double folding seat as set forth in claim 2, wherein the latch cam is rotatably installed on the cushion frame so as to be connected with the sliding member via the latch wire and rotate to unlock a lock plate by pulling of the latch wire.

5. The double folding seat as set forth in claim 4, wherein the lock plate is rotatably installed on the cushion frame, and is rotated to unlock the cushion frame from the leg assembly by rotation of the latch cam.

6. The double folding seat as set forth in claim 5, wherein the stationary bracket includes an insertion slot into which the latch wire is fitted.

7. The double folding seat as set forth in claim 1, wherein the sliding member is elastically supported by an elastic member in a rotational direction thereof so as to return the sliding member to an original position when the sliding member is disengaged with the recliner bracket.

8. The double folding seat as set forth in claim 1, wherein the hinge member is bent-shaped so as to be in contact with the stopper when the cushion frame moves back to the final position.

* * * * *